J. C. SMITH.
AUTOMOBILE TIRE.
APPLICATION FILED MAY 8, 1915.
1,231,957.
Patented July 3, 1917.
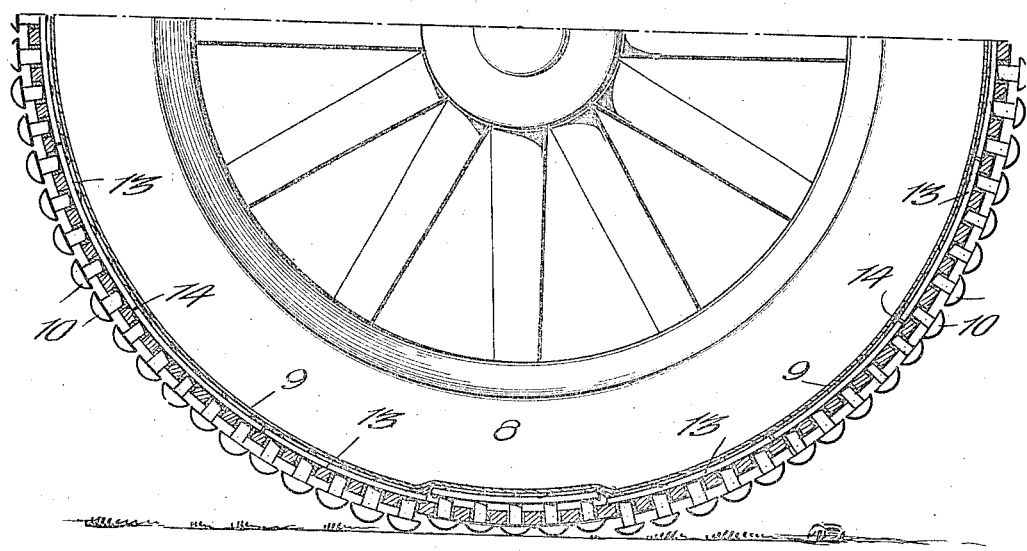
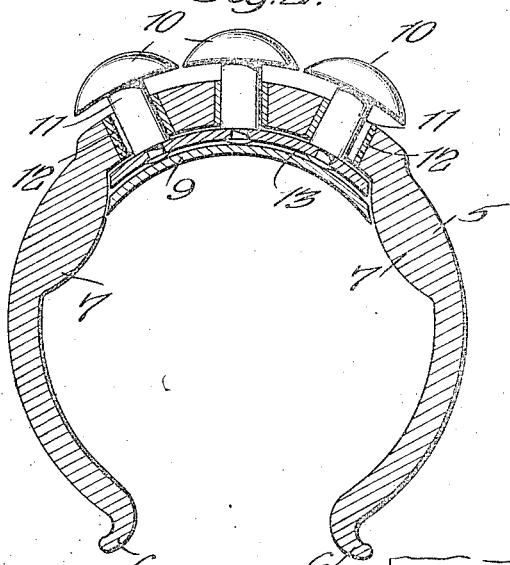
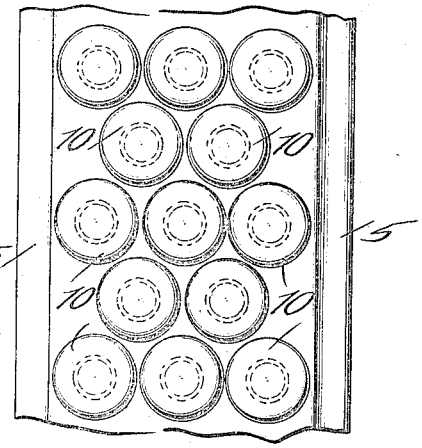
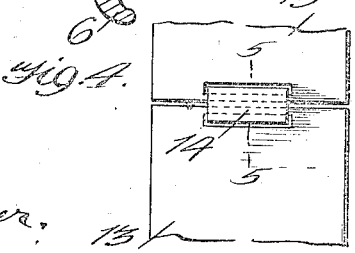
WITNESSES:
INVENTOR
John C. Smith,
BY Munn & Co.
ATTORNEYS

UNITED STATES PATENT OFFICE.

JOHN CALVIN SMITH, OF MOBILE, ALABAMA, ASSIGNOR OF TWENTY-FOUR ONE-HUNDREDTHS TO CHARLES W. HEAD AND TWENTY-FIVE ONE-HUNDREDTHS TO BRUNO GARCIA, BOTH OF MOBILE, ALABAMA.

AUTOMOBILE-TIRE.

1,231,957.   Specification of Letters Patent.   Patented July 3, 1917.

Application filed May 8, 1915. Serial No. 26,853.

*To all whom it may concern:*

Be it known that I, JOHN C. SMITH, a citizen of the United States, and a resident of Mobile, in the county of Mobile and State of Alabama, have invented a certain new and useful Improvement in Automobile-Tires, of which the following is a specification.

This invention relates to an improvement in pneumatic or resilient tires, to be used particularly with automobiles and similar vehicles, and one of the principal objects of the invention is to provide an improved tire in which a rigid casing is utilized in holding a pneumatic tube which acts as a cushioning device for radially movable tread segments supported by the casing and adapted to transmit the road shocks to the pneumatic tube.

Another object of the invention is to provide a resilient or pneumatic tire in the nature of a rigid casing adapted to be connected in ordinary manner to a wheel rim and in which is disposed a pneumatic tube, the casing being provided on its tread portion with a plurality of tread segments in the nature of studs slidably extending through the tread portion of the casing in a radial direction and adapted to be normally maintained in outward position through the action of the resilient or pneumatic tube, these studs or tread segments being connected within the casing with a segmental rim or plate which bears against the pneumatic tube.

A still further object of the invention is to provide a tire of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a view in elevation, partially in section, of a wheel equipped with a tire constructed according to my invention.

Fig. 2 represents a view in section taken transversely through the tire,

Fig. 3 represents a plan view of a portion of the tire looking toward the tread thereof.

Fig. 4 represents a fragmentary view in elevation of adjacent ends of the plates or segmental rim sections, showing the manner in which they are connected together.

Fig. 5 represents a view in section taken on the plane indicated by the line 5—5 of Fig. 4.

In carrying out my invention, I provide a casing 5 which is rigid and which is preferably made of aluminum, steel, or some other suitable metal. This casing is of a shape and configuration similar to the ordinary rubber tire casings in use. The edges of the casing are provided with the outwardly extending flanges 6 whereby said casing may be secured on a wheel rim in the ordinary manner.

Within the casing and extending circumferentially thereof on opposite sides of the tread portion of the casing, are the ribs or ridges 7. They are preferably rounded as shown in order to provide a surface which will not mar or injure the inner tube. Between the ribs 7 is defined a channel or groove. Disposed within the channel or groove and against the inner tube indicated at 8, is a canvas or other suitable lining 9. This lining extends entirely around the inner tube circumferentially thereof, and is adapted to prevent engagement of said inner tube with the plates to which the tread segments are secured.

These segments 10 are in the nature of studs having rounded heads projecting without the casing, and having shanks 11 extending through openings provided in the tread portion of casing 5. These openings are lined with suitable metallic bushings 12 adapted to form bearings for the shanks 11. The inner ends of the studs 10 are suitably connected as by riveting to the segmental rim 13. The latter is arranged within the channel defined between ribs 7 and is disposed between the canvas lining 9 and the tread portion of casing 5. This rim is in the nature of a plurality of plates suitably connected together at their ends in a flexible manner indicated in Figs. 4 and 5. The ends of the plates are provided with elongated openings or slots and in these slots are bent the ends of links 14 in such manner as to allow movement of one plate radially of the wheel relatively to the other plate.

Each of the segments or plates 13 carries a series of the tread segments 10. The members of each series of tread segments, are arranged in rows extending transversely across the tread of the casing, the members in one row being arranged in staggered relation with the members in the next adjacent rows, as indicated in Fig. 3.

When the wheel is in operation, the series of tread segments successively come in contact with the roadway and are thus successively moved radially inwardly with respect to the casing 5 and thus bring the plates or segments 13 to bear against the cushioning device within the casing. This movement of the series of tread segments successively inwardly is allowed without disturbing adjacent segments, because of the loose link connection between the adjacent plates 13. The pressure exerted upon the plates 13 through the action of the inner tube normally maintains these plates outwardly in engagement with the tread portion of casing 5, and thus maintains the studs or tread segments in their outermost position. The tread segments are thus at all times cushioned, and any shocks or vibrations caused by contact with obstructions or foreign obstacles in the roadway will be absorbed through the medium of the pneumatic inner tube.

Such a tire as I have described will be found to be extremely resilient because of the fact that the segments forming the tread of the tire are at all times in contact with and maintained in normal outward position by the inner resilient cushion.

The ribs or ridges 7 which define the channels within which the plates or segments 13 are disposed, provide for maintaining and guiding the plates in proper position and for preventing engagement of said plates with the pneumatic inner tube, so that the latter will not become worn or mutilated through the action of the plates.

Although I have described the preferred embodiment of my invention, I may desire to make such changes in the construction, combination, and arrangement of parts thereof, as do not depart from the spirit of the invention and the scope of the appended claims.

I claim:—

1. A pneumatic tire including a rigid casing adapted to be connected with a wheel rim, a pneumatic tube disposed within the casing, said casing being provided with spaced circumferentially extending rounded ribs defining a channel between them, a flexible lining disposed within said channel and adapted to bear against said pneumatic tube, a plurality of rigid plates arranged between the flexible lining and the tread portion of said casing, said plates being loosely connected together, a series of studs connected with each plate and having their shank portions extending through openings in the tread portion of said casing, bushings disposed in said openings and providing bearings for the stud shanks, said studs being provided with heads on their outer ends, said studs adapted to be normally maintained in outward position through the action of the pneumatic tube.

2. A device of the class described comprising a rigid casing adapted to be connected with a wheel rim, a pneumatic tube arranged within the casing, spaced ribs extending circumferentially of the casing within the same defining a channel between them, a plurality of plates arranged in the channel between the ribs, means loosely connecting the plates together, a series of studs connected with each plate and having their shanks slidably extending through openings in the tread portion of the casing, and pneumatic means arranged within the casing acting against said plates for maintaining the studs in outward position.

3. A device of the class described, including a rigid casing having spaced circumferentially extending ribs defining a channel between them, a plurality of plates arranged within the channel, a plurality of studs carried by each plate and slidably extending through openings in the tread portion of the casing, a cushioning means arranged within the casing acting on said plates for normally maintaining the studs in outward position, and a lining interposed in the channel between the plates and cushioning means.

4. A device of the class described, including a casing having a cushioning device arranged therein, a pair of spaced circumferentially extending ribs arranged in the casing defining a channel between them, a plurality of plates arranged in the channel, against which plates the cushioning device acts, and elements carried by each plate and slidably extending through the tread portion of the casing for engagement with the roadway.

JOHN CALVIN SMITH.

Witness:
C. S. PUTNAM.

Copies of this patent may be obtained for five cents each, by addressing the "Commissioner of Patents, Washington, D. C."